(12) United States Patent
Jung et al.

(10) Patent No.: US 12,555,216 B2
(45) Date of Patent: Feb. 17, 2026

(54) APPARATUS AND METHOD FOR IMPROVING CONSTRUCTION PRECISION BASED ON XR

(71) Applicants: SLZ Inc., Siheung-si (KR); Jae Heon Jung, Seoul (KR); Yu Mi Lee, Incheon (KR)

(72) Inventors: Jae Heon Jung, Seoul (KR); Yu Mi Lee, Incheon (KR); Tae Yang Shin, Siheung-si (KR); Jeong Hwan Lee, Siheung-si (KR)

(73) Assignees: SLZ Inc., Siheung-si (KR); Jae Heon Jung, Seoul (KR); Yu Mi Lee, Incheon (KR)

( * ) Notice: Subject to any disclaimer, the term of this patent is extended or adjusted under 35 U.S.C. 154(b) by 163 days.

(21) Appl. No.: 18/415,039

(22) Filed: Jan. 17, 2024

(65) Prior Publication Data
US 2024/0242323 A1 Jul. 18, 2024

(30) Foreign Application Priority Data
Jan. 18, 2023 (KR) .................. 10-2023-0007490

(51) Int. Cl.
| G06T 7/00 | (2017.01) |
| G06F 30/13 | (2020.01) |
| G06K 7/14 | (2006.01) |
| G06T 19/20 | (2011.01) |

(52) U.S. Cl.
CPC ............ *G06T 7/0002* (2013.01); *G06F 30/13* (2020.01); *G06K 7/1417* (2013.01); *G06T 19/20* (2013.01); *G06T 2207/30204* (2013.01); *G06T 2210/36* (2013.01); *G06T 2219/2004* (2013.01)

(58) Field of Classification Search
None
See application file for complete search history.

(56) References Cited

U.S. PATENT DOCUMENTS

| 9,204,131 B2 * | 12/2015 | Arrasvuori ............... G06T 19/20 |
| 10,867,447 B2 * | 12/2020 | Price ....................... G06T 17/00 |
| 2016/0162129 A1 * | 6/2016 | Tone ...................... G06T 11/206 715/735 |
| 2017/0038912 A1 * | 2/2017 | Nishida ................. G06F 3/0425 |
| 2019/0033074 A1 * | 1/2019 | Ikeda ..................... G01B 11/14 |

(Continued)

FOREIGN PATENT DOCUMENTS

| KR | 10-1201129 B1 | 11/2012 |
| KR | 10-2017-0095010 A | 8/2017 |
| KR | 10-2332407 B1 | 11/2021 |

OTHER PUBLICATIONS

Office Action issued in KR 10-2023-0007490; mailed by the Korean Intellectual Property Office on Feb. 23, 2024.

*Primary Examiner* — Martin Mushambo
(74) *Attorney, Agent, or Firm* — Studebaker Brackett PLLC

(57) ABSTRACT

Disclosed is an apparatus for improving construction precision based on extended reality (XR). At least one piece of XR content related to a construction target positioned in front inside a construction site is displayed on a display unit. When a construction position of a construction object included in the construction target is determined, the XR content including the design information of the construction object at the construction position is displayed on the display unit.

10 Claims, 18 Drawing Sheets

(56) References Cited

U.S. PATENT DOCUMENTS

2019/0347783 A1* 11/2019 Salgian ................ G02B 27/017
2020/0234498 A1*  7/2020 Price ........................ G06T 7/12
2022/0405718 A1* 12/2022 Jung ...................... G06V 20/20

* cited by examiner

APPARATUS AND METHOD FOR IMPROVING CONSTRUCTION PRECISION BASED ON XR

CROSS-REFERENCE TO RELATED APPLICATIONS

A claim for priority under 35 U.S.C. § 119 is made to Korean Patent Application No. 10-2023-0007490 filed on Jan. 18, 2023 in the Korean Intellectual Property Office, the entire contents of which are hereby incorporated by reference.

BACKGROUND

Embodiments of the present disclosure described herein relate to an apparatus for improving construction precision based on extended reality (XR).

Recently, an extended reality (XR) technology has been employed in many fields.

Meanwhile, the XR technology has not yet been applied to fields such as building, construction, and surveying, and previous construction and surveying technologies are used without change, so inefficient construction has continuously been performed due to frequent errors.

Accordingly, it is expected that the error is significantly reduced to improve the construction precision, when the XR technology is applied even to the building, the construction, or the surveying. Accordingly, costs may be reduced and extra work may be significantly reduced. However, currently, such a technology is not open.

SUMMARY

Embodiments of the present disclosure provide an apparatus for providing construction precision based on XR.

Embodiments of the present disclosure provide an apparatus for providing construction precision based on XR, capable of displaying, on a display unit, at least one piece of XR content related to a construction target.

Embodiments of the present disclosure provide an apparatus for providing construction precision based on XR, capable of displaying, on a display unit, XR content, which contains design information of a construction object, at a construction position of the construction object included in a construction target, when the construction position is determined.

Problems to be solved by the present disclosure are not limited to the problems mentioned above, and other problems not mentioned will be clearly understood by those skilled in the art from the following description.

According to an embodiment of the present disclosure, an apparatus for improving construction precision based on extended reality (XR) includes a display unit to display at least one piece of XR content related to a construction target positioned in front inside a construction site, a sensor unit to recognize an identification (ID) code for information related to the construction target in the construction site, and a processor to acquire the related information through the ID code recognized through the sensor unit, detect a construction position of the construction target, based on the acquired related information, and control to display the XR content on the display unit, based on the detected construction position.

In addition, the processor may control to display XR content, which includes design information of a specific construction object, which included in the specific construction target, at a construction position of the specific construction object, on the display unit, when the construction position of the specific construction object included in the specific construction target is determined, based on a sensing result obtained through the sensor unit.

In addition, the processor may control to display XR content, which is to instruct a construction object included in the construction target to be marked at a position to be constructed, on the display unit, based on a sensing result obtained through the sensor unit.

In addition, the processor may recognize construction instruction information marked in the construction site, based on the sensing result obtained through the sensor unit, and compare the construction instruction information recognized with design information of a design object to calculate an error rate.

In addition, the processor may display, on the display unit, at least one piece of XR content including correction information for correct an error of the recognized construction instruction information, based on the construction instruction information and the design information of the construction object, when the calculated error rate is out of a preset error range.

In addition, the processor may determine a construction stage of the construction target by identifying at least one of a construction object constructed in a construction site or construction instruction information marked in the construction site, based on the sensing result obtained through the sensor unit, and control to display at least one piece of XR content for next construction of the construction target on the display unit, depending on the determined construction stage.

In addition, the apparatus may sense the construction site without movement, to a time point at which construction of the construction target is finished, from a time point at which the construction of the construction target is started In addition, the processor may determine the construction position of the construction target in a relational enhancement manner, based on position relationship between a plurality of identification codes sensed through the sensor unit, when the plurality of identification codes are sensed through the sensor unit.

According to an embodiment of the present disclosure, a method executed by an apparatus for improving construction precision based on XR may include recognizing an ID code for information related to a construction target in a construction site, based on a sensing result obtained through a sensor unit, acquiring the related information, based on the recognized ID code, detecting the construction position of the construction target, based on the acquired related information, and displaying at least one piece of XR content related to the construction target positioned in front, in the construction site on a display unit, based on the detected construction position.

Besides, computer program stored in a computer-readable medium to execute a method for implementing the present disclosure may be further provided.

Besides, a computer-readable medium having computer program to execute a method for implementing the present disclosure may be further provided.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
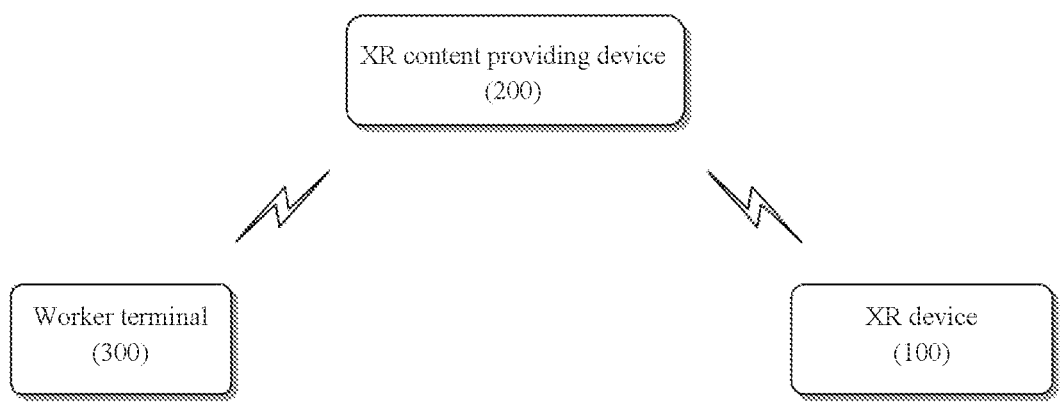
FIG. 1 is a schematic view illustrating a system to improve construction precision based on XR, according to an embodiment of the present disclosure.

The same reference numerals will be assigned to the same components throughout the whole specification. In the following description of the present specification, all components are not described, and content well known in the art to which the present disclosure pertains or the duplication between embodiments will be omitted. In the specification, the terms "unit", "~module", "~member" or "~block" may be implemented in software or hardware. According to embodiments, a plurality of units, a plurality of modules, a plurality of members, or a plurality of blocks can be implemented by using one component or one unit, one module, one member, or one block may include a plurality of components.

In the whole specification, when a certain part is "linked to", "coupled to", or "connected with" another part, the certain part may be directly linked to, coupled to or connected with the another part, and an indirection link, an indirection coupling, or an indirection connection includes a link, a coupling, or a connection through a wireless communication network.

It will be understood that the terms "comprises," "comprising," "includes" and/or "including," when used herein, specify the presence of stated elements and/or components, but do not preclude the presence or addition of one or more other elements and/or components.

In the present specification, when a member is positioned on another member, this includes not only when the member is in contact with the other member, but also when another member is present between the two members.

In the specification, the term "first and/or second" will be used to distinguish between components, and the components are not limited to the above-described terminology.

The articles "a", "an", and "the" are singular in that they have a single referent, but the use of the singular form in the specification should not preclude the presence of more than one referent.

Reference numerals in steps are only for the illustrative purpose, and not used to describe the sequence of the steps. The steps may be replicated in a sequence different from a sequence, which is described, unless otherwise specified.

Hereinafter, the operating principle of the present disclosure and embodiments will be described with reference to accompanying drawings.

Herein, an "XR device 100 according to the present disclosure" includes various devices to provide a result for a user by performing an arithmetic operation. For example, the "XR device 100 according to the present disclosure" may be provided in the form of any one of a computer, a server device, and a portable terminal.

In this case, the computer may for example, include a laptop computer, a desktop, a laptop, a tablet PC, or a slate PC equipped with a WEB browser.

The server device, which is a server to process information by making communication with an external device, may include an application server, a computing server, a database server, a file server, a game server, an e-mail server, a proxy server, and a web-server.

The portable terminal, which is, for example, a wireless communication device ensuring portability and mobility, may include, all kinds of handheld-based wireless communication devices, such as a Personal Communication System (PCS), a Global System for Mobile communications (GSM), a Personal Digital Cellular (PDC), a Personal Handyphone System (PHS), a Personal Digital Assistant (PDA), an International Mobile Telecommunication (IMT)-2000, a Code Division Multiple Access (CDMA)-2000, a W-Code Division Multiple Access (W-CDMA), a Wireless Broadband Internet (Wibro) terminal, or a wearable device such as a watch, a ring, a bracelet, an anklet, a necklace, glasses, contact lens, or a head-mounted-device (HMD).

Hereinafter, embodiments of the present disclosure will be described in detail with reference to the accompanying drawings.

FIG. 1 is a schematic view illustrating a system (hereinafter, XR content providing system) for providing content based on XR according to an embodiment of the present disclosure.

Referring to FIG. 1, the XR content providing system 10 includes the XR device 100, XR content providing device 200, and a worker terminal 300.

According to an embodiment of the present disclosure, the XR content providing device 200 receives design data from terminals of various workers. This is because design data for various construction processes (targets) such as Civil, Structure, Architecture, HVAC, UT, EL, IN, FF, or FI are required for the design of construction facilities, and the person in charge of designing the construction facilities may have various characteristics.

According to an embodiment of the present disclosure, the XR content providing system 10 is the system 10 having a process for integrating individual construction processes is established, and applied with a coding technology personally developed and applied to the system 10.

According to an embodiment of the present disclosure, the XR content providing device 200 generates XR content for a construction site using design data received from various workers as described above.

In addition, the XR content providing device 200 provides the generated XR content to the XR device 100 worn by workers working at the construction site, edits the XR content based on editing information received from the XR device 100, and reflects the editing result in the design data.

In this case, the XR content providing device 200 may edit the XR content based on the received editing information, and update the editing details to the BIM design data and a tool (Revit).

According to an embodiment of the present disclosure, the XR content providing device 200 collects Revit data, which is uploaded by a BIM manager, for each part, transforms a file format, performs automation processing to a template import, and generates XR content, and provides the generated XR content to the XR device 100. Thereafter, the XR content is displayed through the XR device 100 worn by a worker.

In addition, according to an embodiment of the present disclosure, when editing information, such as additional placement or adjustment of shape information, is received by the XR device 100 of a site worker, the XR content providing device 200 transforms the received editing information into a Revit file format.

In addition, the worker at the site may determine information on design information or a construction position related to a target (construction target) to be constructed at the construction site using the XR device 100.

Hereinafter, an operation of the XR device 100 will be described in more detail with reference to other drawings.

Figure 2:
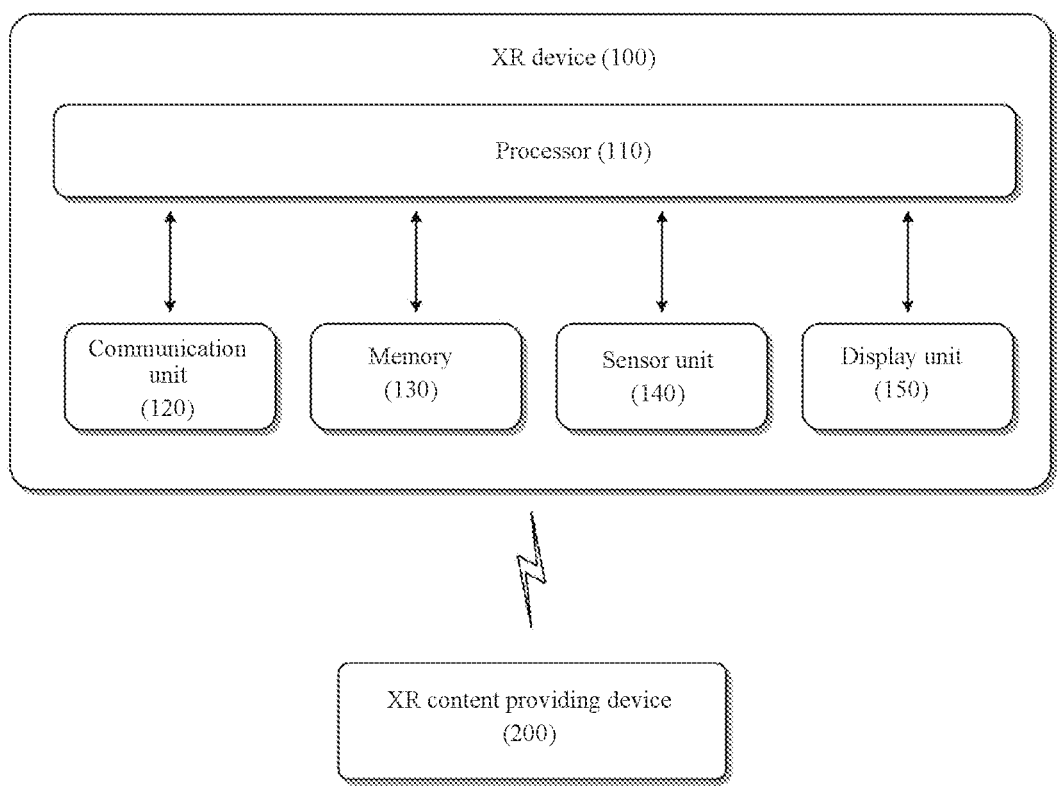
FIG. 2 is a block diagram illustrating an XR device for improving construction precision based on XR, according to an embodiment of the present disclosure.

FIG. 2 is a block diagram illustrating the XR device 100 for improving construction precision based on XR, according to an embodiment of the present disclosure.

Referring to FIG. 2, the XR device 100 for improving construction precision based on XR according to an embodiment of the present disclosure includes a processor 110, a communication unit 120, a memory 130, a sensor unit 140, and a display unit 150.

However, according to some embodiments, the XR device 100 may include fewer components or more components in number than the components illustrated in FIG. 2.

The processor 110 may be implemented through an algorithm for controlling the operation of components provided in the XR device 100 for improving construction precision based on XR, or the memory 130 for storing data for a program for reproducing the algorithm, and at least one processor 110 for performing the above operation using the data stored in the memory 130. In this case, the memory 130 and the processor 110 may be implemented using separate chips. Alternatively, the memory 130 and the processor 110 may be implemented into a single chip.

In addition, the processor 110 may perform a control operation by combining any one component or a plurality of components described above, to implement various embodiments of the present described, which are to be described with reference to following drawings, on the XR device 100 to improve construction precision based on the XR.

The XR device 100 may make communication with the XR content providing device 200 through the communication unit 120.

According to an embodiment of the present disclosure, the XR content providing device 200 is configured to further include a server device and may be implemented in the form of a server.

The communication unit 120 may include one or more components that enable communication with an external device, and for example, may include at least one of a broadcast receiving module, a wired communication module, a wireless communication module, a short-range communication module, and a position information module.

The wired communication modules may include various wired communication modules, such as local area network (LAN) modules, wide area network (WAN) modules, or value added network (VAN) modules, and various cable communication modules, such as a universal serial bus (USB), a high definition multimedia interface (HDMI), a digital visual interface (DVI), an RS-232 (recommended standard 232), power line communication, or plain old telephone service (POTS).

In addition to a Wi-Fi module and a wireless broadband module, the wireless communication module may include wireless communication modules which support various wireless communication methods such as global system for mobile communication (GSM), code division multiple access (CDMA), wideband code division multiple access (WCDMA), a universal mobile telecommunications system (UMTS), Time Division Multiple Access (TDMA), Long Term Evolution (LTE), 4G, 5G, or 6G.

The wireless communication module may include a wireless communication interface including an antenna to transmit a signal and a transmitter. In addition, the wireless communication module may further include a signal conversion module configured to modulate a digital control signal, which is output from the controller, to an analog wireless signal through the wireless communication interface, under the control of the controller.

The short-range communication module, which is used for short range communication, may support short range communication by using at least one of Bluetooth, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies.

The sensor unit 140 senses at least one of internal information of the XR device 100 for improving the construction precision based on XR, surrounding environment information of the XR device 100 which improves the construction precision based on XR, and user information, and generates a sensing signal corresponding thereto. The controller may drive the XR device 100 for improving the construction precision based on the XR, or control the operation of the XR device 100 for improving the construction precision based on the XR, processes data related to an application program installed in the XR device 100 for improving the construction precision based on the XR, or perform the function or the operation of the XR device 100 for improving the construction precision based on the XR.

As described above, the sensor unit 140 may include at least one of a proximity sensor, an illumination sensor, a touch sensor, an acceleration sensor, a magnetic sensor, a magnetic sensor, a G-sensor, a gyroscope sensor, a motion sensor, an RGB sensor, an infrared sensor, a finger scan sensor, an ultrasonic sensor, an optical sensor (for example, a camera), a microphone, or an environmental sensor (e.g., a barometer, a humidity meter, a radioactivity sensor, a heat sensor, or a gas sensor), or a chemical sensor (for example, a healthcare sensor, or a biometric sensor). Meanwhile, the XR device 100 for improving the construction precision based on the XR may utilize the combination of multiple pieces of information sensed by at least two sensors among the above sensors.

According to an embodiment of the present disclosure, the sensor unit 140 may include at least one LiDAR device or at least one camera.

In addition, various sensors may be employed as long as the sensors are to perform a method for improving the printed circuit board of claim based on the XR.

The camera processes an image frame, such as a still image frame, or a moving picture frame, obtained by the image sensor in a photographing mode. The processed image frame may be displayed on the display unit 150 or stored in the memory 130.

According to an embodiment of the present disclosure, the XR device 100 may include a transparent display to operate based on augmented reality.

The display unit 150 displays at least one piece of XR content related to a construction target located in front of the construction site.

The person in charge of the construction site may wear the XR device 100, secure a field of view through the transparent display, and determine at least one piece of XR content provided to the transparent display.

The display unit 150 displays (outputs) information processed by the XR device 100 for improving the construction precision based on XR. For example, the display unit 150 may display execution screen information of the application program (e.g., an application) run by the XR device 100 for improving the construction precision based on XR, or user interface (UI) or graphic user interface (GUI) information based on the execution screen information.

The memory 130 may store data for supporting various functions of the XR device 100 for improving the construction precision based on XR, input/output data (for example, a music file, a still image, or a moving picture image), various application programs (or applications) run on the XR device 100 for improving the construction precision based on the XR, and data and instructions for the operation of the XR device 100 for improving the construction precision based on the XR. At least some of these applications may be downloaded from an external server through wireless communication.

The memory 130 may include at least one type storage medium among a memory in the type of a flash memory (e.g., see reference numeral 130), a hard disk type, an SSD type, a solid state disk type, a silicon disk drive type, a multimedia card micro type, or a card type (for example, an SD memory or an XD memory), a random access memory (RAM), a static random access memory (SRAM), a read-only memory (ROM), an electrically erasable programmable read-only memory (EEPROM), a programmable read-only memory, a magnetic memory, a magnetic disk, or an optical disk. In addition, the memory 130 may be separated from the XR device 100 for improving the construction precision based on the XR, but may include a database connected to in a wired or wireless manner.

According to an embodiment of the present disclosure, the XR device 100 may further include an input unit, an output unit, and an interface unit.

According to an embodiment of the present disclosure, the XR device 100 may be applied with "Hololens2". Components included in the "Hololens2" may be employed as components of the XR device 100.

The input unit is to input image information (or signal), audio information (or signal), data, or information input from a user, and may include at least one of a camera, at least one microphone, or a user input unit. The voice data or image data collected by the input unit may be analyzed and processed through a user control command.

The user input unit is to receive information from a user. When information is input through the user input unit, the controller may control the operation of the XR device 100 for improving the construction precision based on XR to correspond to the input information. The user input unit may include a hardware-type physical key (for example, a button, a dome switch, a jog wheel, or a jog switch, etc. positioned on at least one of the front, rear, and side surfaces of the XR device 100 for improving the construction precision based on XR), and a software-type touch key. For example, the touch key may include a virtual key, a soft key, or a visual key displayed on the display unit 150 in the touch-screen type through software processing, or may include a touch key positioned in a part other than the touch screen. Meanwhile, the virtual key or the visual key may be displayed in various forms on the touch screen, and may be, for example, graphic, a text, an icon, a video, or the combination thereof.

The output unit, which is to generate an output related to visual, auditory, or tactile senses, may include at least one of the display unit 150, an audio output unit, a haptic module, or a light output unit. The display unit 150 may implement a touch screen by forming a layered structure with or integrally forming a touch sensor. Such a touch screen, which functions as a user input unit which provides an input interface between the XR device 100 for improving the construction precision based on XR and the user, while providing an output interface between the XR device 100 for improving the construction precision based on the XR and the user.

The sound output unit may output audio data received through the communication unit 120 or stored in the memory 130, or output a sound signal related to functions performed by the XR device 100 for improving the construction precision based on the XR. The sound output unit may include a receiver, a speaker, or a buzzer.

The interface unit serves as a passage with various types of external devices connected to the XR device 100 for improving the construction precision based on the XR. Such an interface unit may include at least one of a wired/wireless headset port, an external charger port, a wired/wireless data port, a memory card port, a port connecting a device equipped with an identification module (SIM), an audio I/O (Input/Output) port, a video I/O (Input/Output) port, or an earphone port. The interface unit may perform a proper control operation related to an external device connected to the interface unit, in the XR device 100 for improving the construction precision based on the XR.

Figure 3:
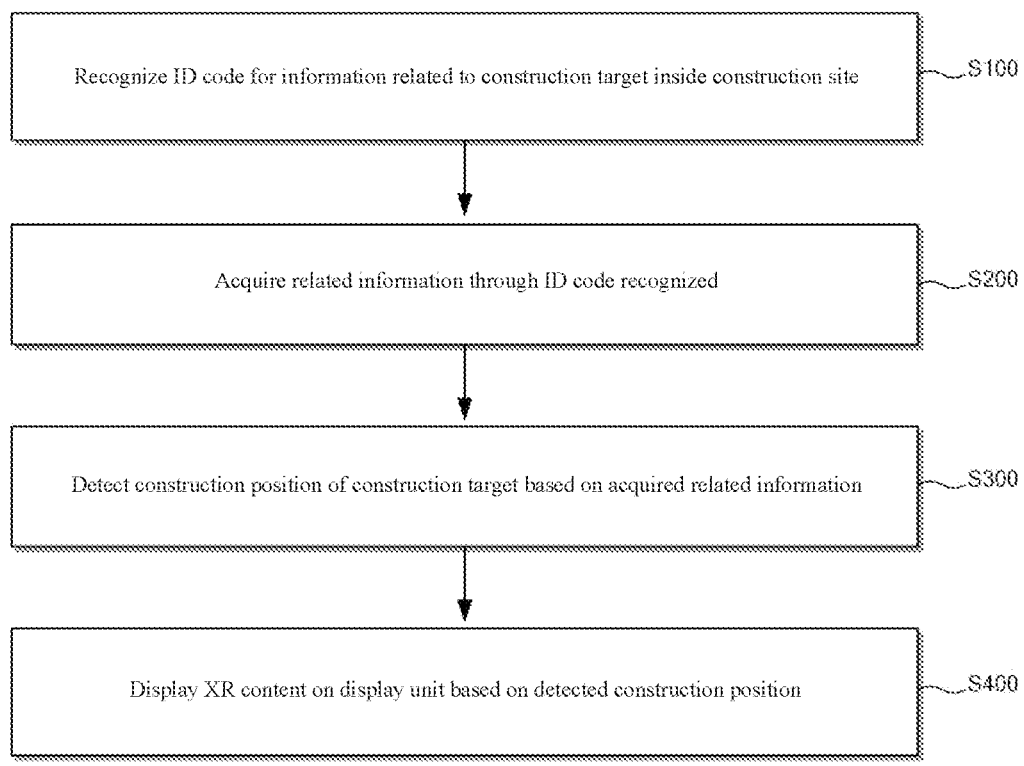
FIG. 3 is a flowchart illustrating a method for improving the construction precision based on XR, according to an embodiment of the present disclosure.

FIG. 3 is a flowchart illustrating a method for improving the construction precision based on XR, according to an embodiment of the present disclosure.

The processor 110 recognizes an identification (ID) code for information related to the construction target positioned inside the construction site, based on the sensed result by the sensor unit 140 (S100)

The processor 110 acquires related information based on the ID code recognized in S100. (S200)

Figure 4:
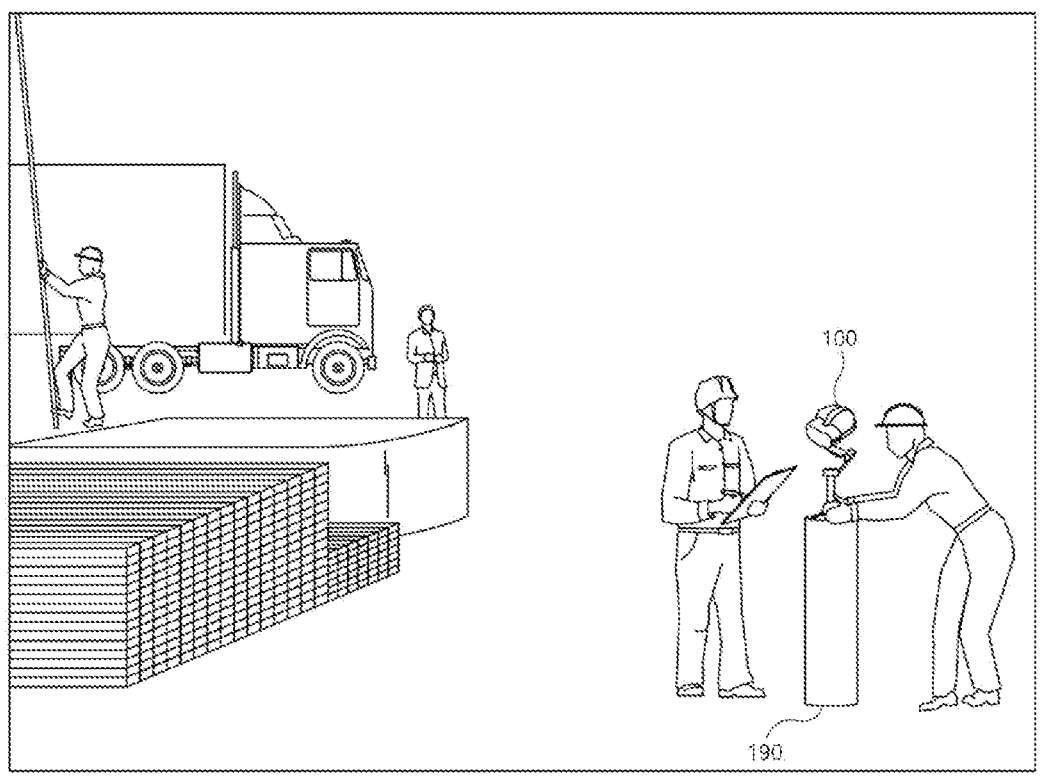
FIG. 4 is a view illustrating sensing forward by installing an XR device in a construction site.

FIG. 4 is a view illustrating sensing forward by installing the XR device 100 in a construction site.

Referring to FIG. 4, when first sensing the construction site, the XR device 100 may sense the construction site, without movement to a time point at which the construction is finished, from a time point at which construction of the construction target is started.

The XR device 100 may be mounted on a mounting member 190 as illustrated in FIG. 4, and the mounting member 190 may include a beacon.

After sensing the construction site at the fixed position, the XR device 100 may sense the construction site by recognizing the change in position as the XR device 100 moves.

The sensor unit 140 may recognize an ID code for the information on the construction target within the construction site.

According to an embodiment of the present disclosure, the processor 110 may sense the construction site through the camera of the sensor unit 140.

The processor 110 may recognize at least one ID code, a mark displayed for construction of the construction target, and a completed construction target, from an image captured by the camera. The processor 110 may synchronize the actual object with at least one piece of XR content displayed on the display unit 150 based on the recognized result.

The processor 110 determines the construction position of the construction target, based on the related information obtained in S300 (S300)

The processor 110 displays at least one piece of XR content on the display unit 150, based on the construction position identified in S300 (S400)

The worker at the construction site may display the construction position for the construction target at the construction site by referring to the XR content displayed on the display unit 150.

According to an embodiment, the processor 110 may display the XR content including the construction position for constructing the construction target, on the display unit 150.

According to an embodiment, the processor 110 may display at least one piece of XR content for instructing the construction target included in the construction target to be marked/displayed on a position for constructing, on the display unit 150, based on the result sensed through the sensor unit 140.

Figure 5:
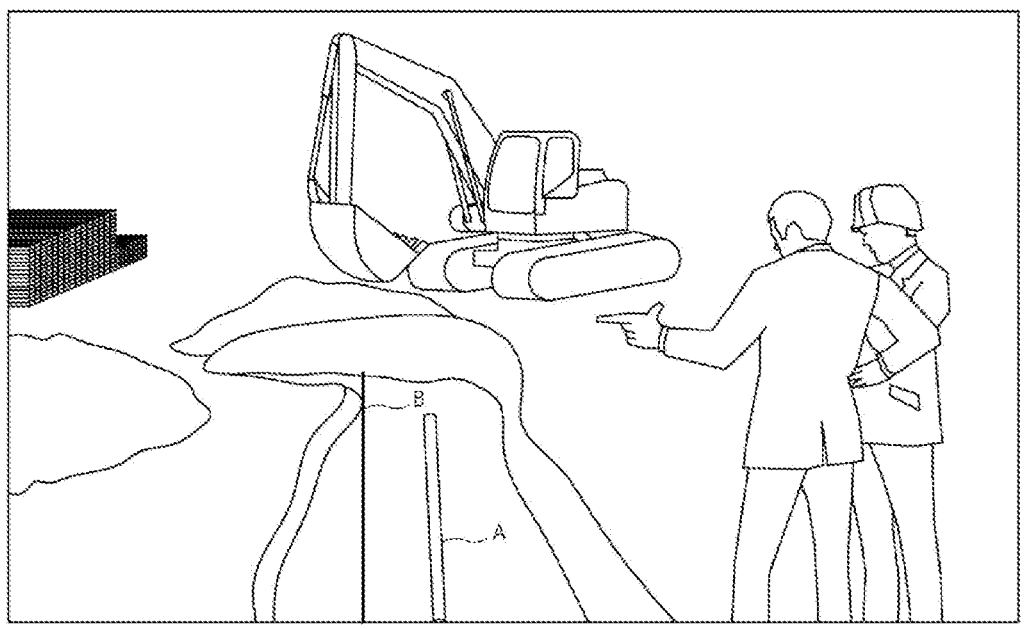
FIG. 5 is a view illustrating that a construction position of a construction target (pipeline) to be actually constructed next to an pipeline is marked in a construction site.

FIG. 5 is a view illustrating that the construction position of the construction target (pipeline) to be actually constructed next to a pipeline is marked in the construction site.

Referring to FIG. 5, reference numeral "A" indicates an object which has already been installed, and reference numeral "B" indicates a mark (information for instructing construction) of a construction object, which is displayed on the display unit 150 by the processor 110, constructed at a construction site by a worker When the information (construction instruction information) for instructing construction is marked/displayed to construct the construction object as described above, a request is made such that a person in charge of the construction proceeds with the construction.

According to an embodiment of the present disclosure, the construction target may include at least one construction object. When one construction object is provided, the construction target may be the construction object itself.

According to an embodiment, the processor 110 may recognize the construction instruction information marked at the construction site, based on the result sensed through the sensor unit 140, and calculate an error rate by comparing the recognized construction instruction information with the XR content provided when instructing the construction position.

More specifically, the processor 110 may recognize the construction instruction information marked at the construction site based on the result sensed through the sensor unit 140, and calculate an error rate (degree of error) by comparing the recognized construction instruction information with design information or BIM design data of the corresponding construction object.

According to an embodiment, when the calculated error rate (degree of error) is out of a preset error range or exceeds a preset error range, the processor 110 may display at least one piece of XR content, which includes correction information for correcting the error of the recognized construction instruction information, on the display unit 150, based on the construction instruction information and design information (BIM design data) of the corresponding construction object.

A worker in the site may identify the correction information displayed on the display unit 150 and mark/display construction instruction information again. Accordingly, the error may easily be corrected/modified, as compared to a conventional technology.

According to an embodiment, the correction information may include at least one of information on the construction object having the error, a portion, which requires error-correction, of the construction instruction information, and information on a position for constructing the corresponding construction object. According to some embodiments, when the portion, which requires the error-correction, of the construction instruction information is equal to or greater than a reference value, the processor 110 may delete the construction instruction information and may derive the correction information for instructing a new mark.

Figure 6:
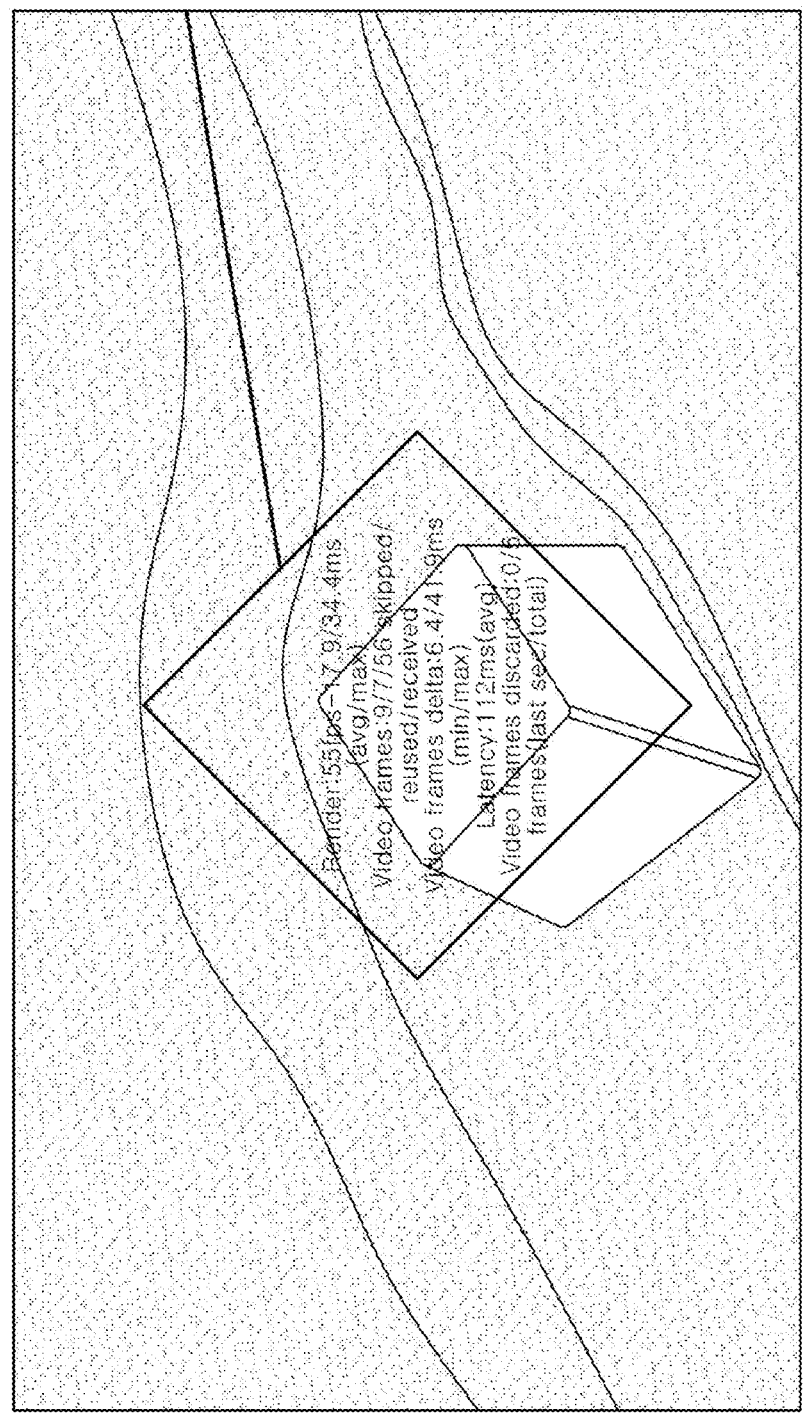
FIG. 6 is a view illustrating that XR content including design information of a construction object is displayed on a display unit.

FIG. 6 is a view illustrating that the XR content including design information of a construction object is displayed on the display unit 150.

Referring to FIG. 6, when the construction position of the specific construction object included in the construction target is determined based on the result sensed through the sensor unit 140, the processor 110 may control the XR content including design information of the specific construction object at the determined construction position of the specific construction object, to be displayed on the display unit 150.

Figure 7:
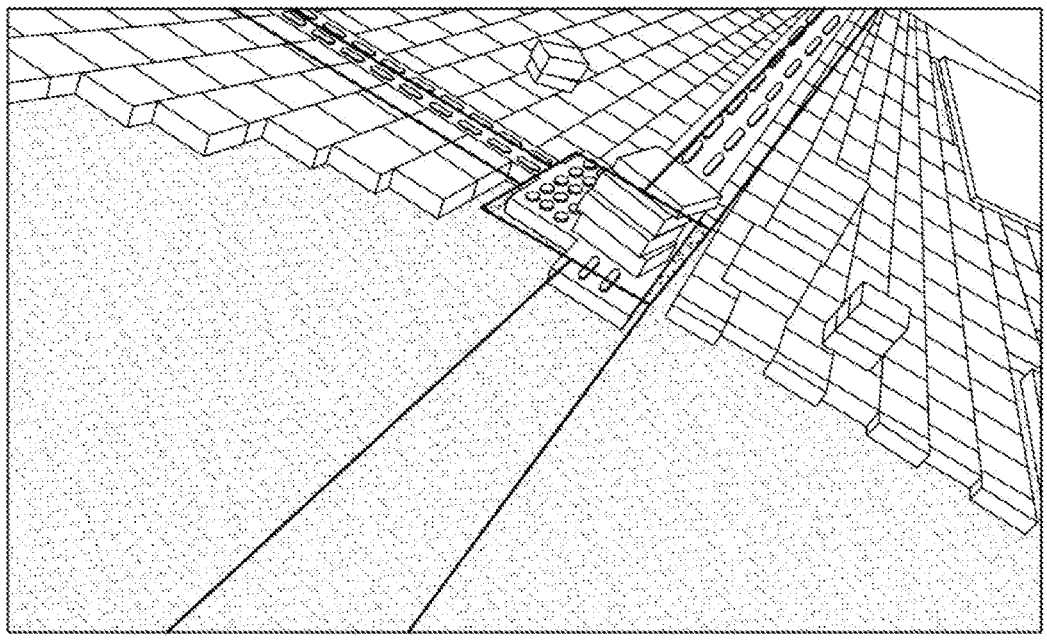
FIG. 7 is a view illustrating that an installation position of a braille block on a sidewalk block is marked using XR content.

FIG. 7 is a view illustrating that an installation position of a braille block on a sidewalk block is marked using XR content.

Figure 8:
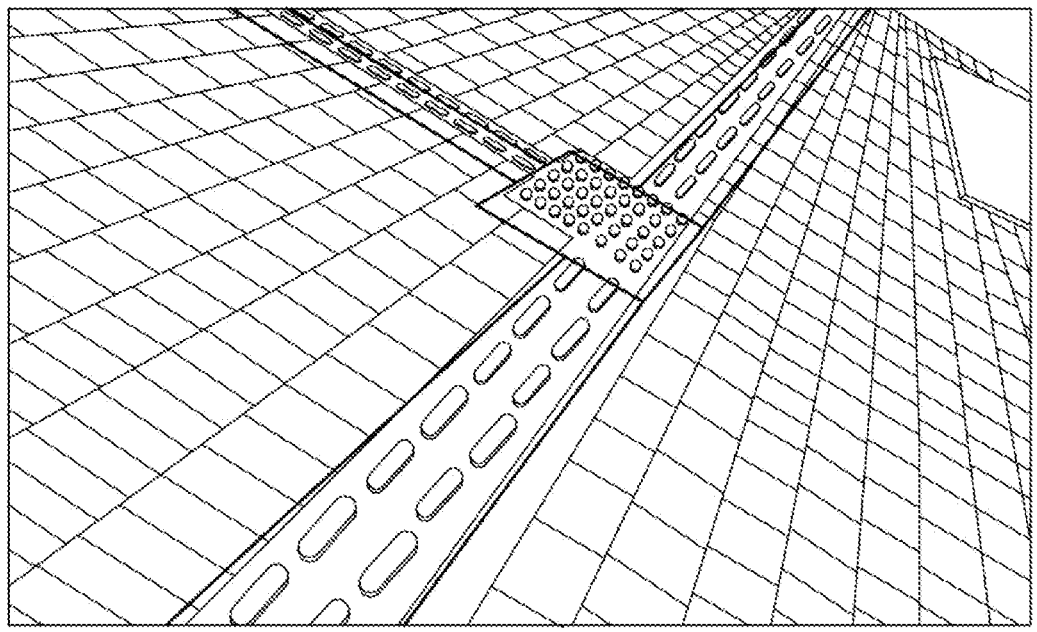
FIG. 8 is a view illustrating that a braille block is constructed based on the XR content of FIG. 6.

FIG. 8 is a view illustrating that a braille block is constructed based on the XR content of FIG. 6.

The worker in the construction site may recognize the XR content for construction of the braille block displayed on the display unit 150 of the XR device 100 and display/mark construction instruction information at the construction site. In addition, a person in charge of the construction for the braille block may construct the braille block as illustrated in FIG. 8, based on the construction instruction information displayed/marked at the construction site.

Figure 9:
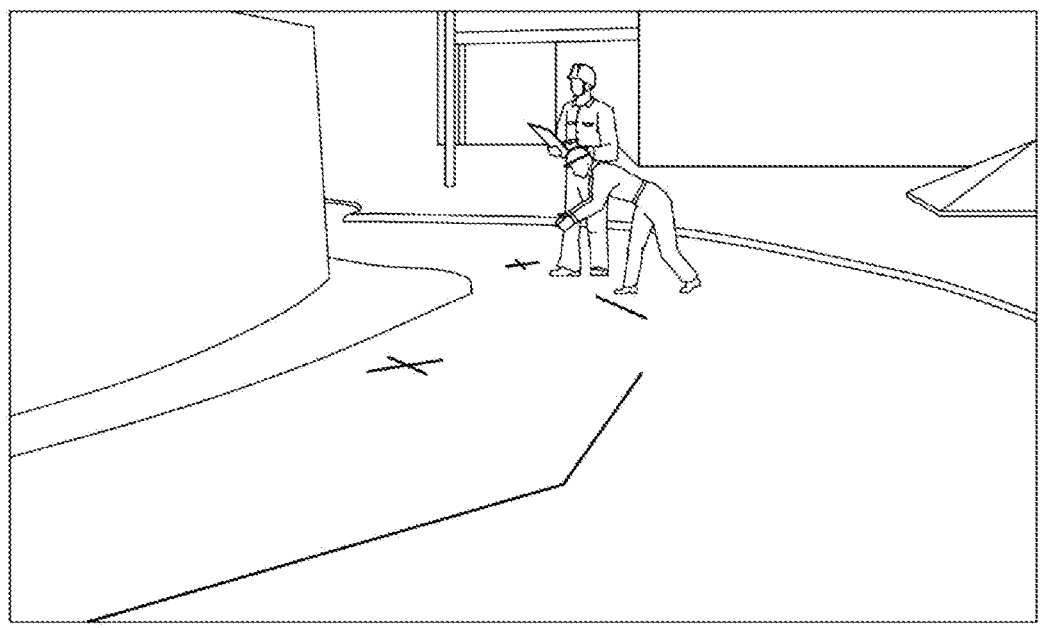
FIG. 9 is a view illustrating that a construction position of a construction object is marked in a construction site, based on XR content for a construction object.

FIG. 9 is a view illustrating that the construction position of the construction object is marked at the construction site, based on the XR content for the construction object.

Figure 10:
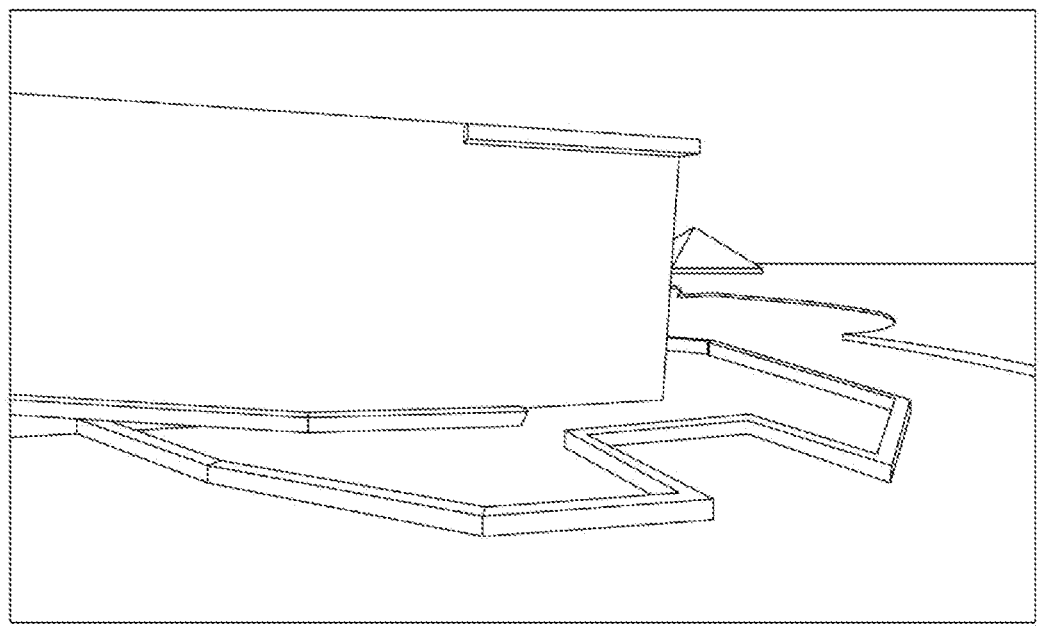
FIG. 10 is a view illustrating that a construction object is constructed, depending on a construction position illustrated in FIG. 8.

FIG. 10 is a view illustrating that a construction object is constructed depending on the construction position illustrated in FIG. 8.

Figure 11:
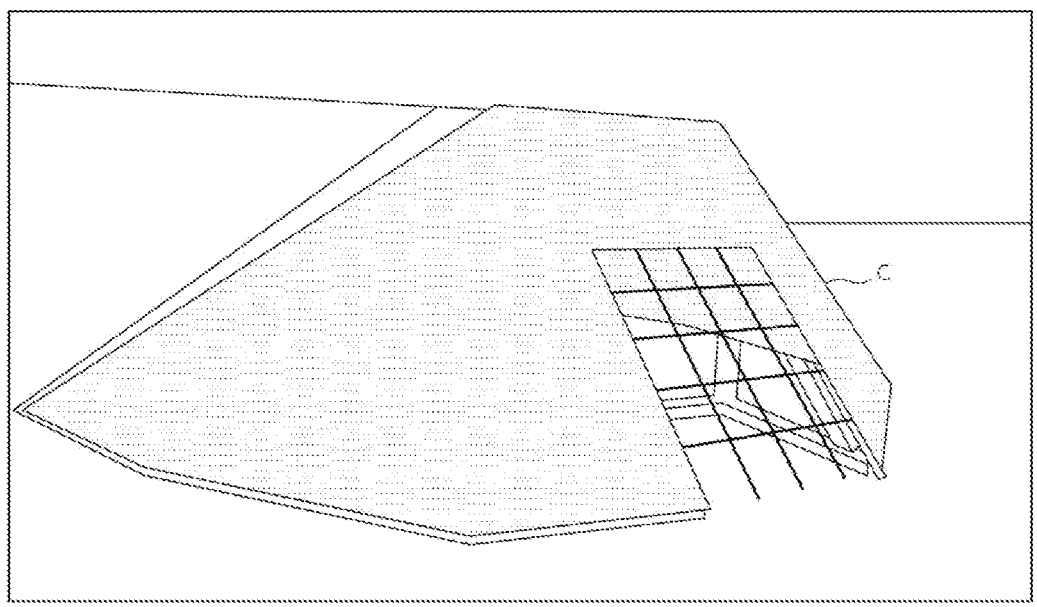
FIG. 11 is a view illustrating that a construction object to be constructed next to a construction stage of FIG. 10 is displayed using XR content.

FIG. 11 is a view illustrating that a construction object to be constructed next to the construction stage of FIG. 10 is displayed using the XR content.

When the construction site is sensed through the sensor unit 140 while the block (construction object) is constructed as illustrated in FIG. 10, the processor 110 may determine a construction stage of the construction target, based on the result sensed through the sensor unit 140.

The processor 110 may recognize the construction object constructed at the construction site based on the design information including the construction position for at least one construction object included in the construction target, determine the construction stage based on the recognized construction object, and detect the construction object to be constructed next.

In addition, the processor 110 may control to display at least one piece of XR content for the construction of the construction object to be constructed next, on the display unit 150.

According to an embodiment, the processor 110 may determine the construction stage of a construction target by identifying at least one of a construction object constructed at the construction site or construction instruction information marked/displayed at the construction site, based on the result sensed through the sensor unit 140.

According to an embodiment, the processor 110 may display at least one piece of XR content for the next construction (next construction object) of the construction target, on the display unit 150, depending on the determined construction stage.

According to an embodiment of the present disclosure, a QR code may be applied to the ID code, and various units are applicable as long as the various units perform an identifying operation.

According to an embodiment, each ID code may be used as a trigger unit which stores the coordinates of the construction site, and position information of the XR content (specifically position information of an object (object) in the XR content) or loads the position information.

According to an embodiment, when a plurality of ID codes sensed through the sensor unit 140 are provided, the processor 110 may determine the construction position of the construction target in a relational enhancement manner, based on the position relationship between the plurality of identification codes sensed through the sensor unit 140.

The XR device 100 should determine the construction position of the construction target using only one ID code or determine using at least one of an object around the ID code, construction instruction information, and a construction object. When the plurality of ID codes are sensed as described above, the construction position of the construction target is detected based on the position relationship between ID codes through the relational enhancement manner. Accordingly, in more detail, the construction target, and the construction position of the construction object may be determined.

According to an embodiment of the present disclosure, the XR device 100 may store at least partial XR content of at least one piece of XR content for a construction target in the memory 130, and may receive the XR content from the XR content providing device 200 through the communication unit 120.

According to an embodiment, the processor 110 of the XR device 100 may generate editing information, which is contained in the XR content, for the XR content, depending on an editing input to the XR device 100 and provide the editing information to the XR content providing device 200.

According to an embodiment, when a user gesture is recognized in a captured image of the sensor unit 140 and the recognized gesture is determined as corresponding to editing information for a specific object in the XR content, the processor 110 may provide the editing information to the XR content providing device 200 to reflect the change corresponding to the editing information in the XR content. In addition, the processor 110 may provide the XR content, in which the editing information is reflected, back to the extended reality device according to an embodiment.

Hereinafter, the XR content providing device 200 to produce the XR content used in the above-described embodiment will be described.

Figure 12:
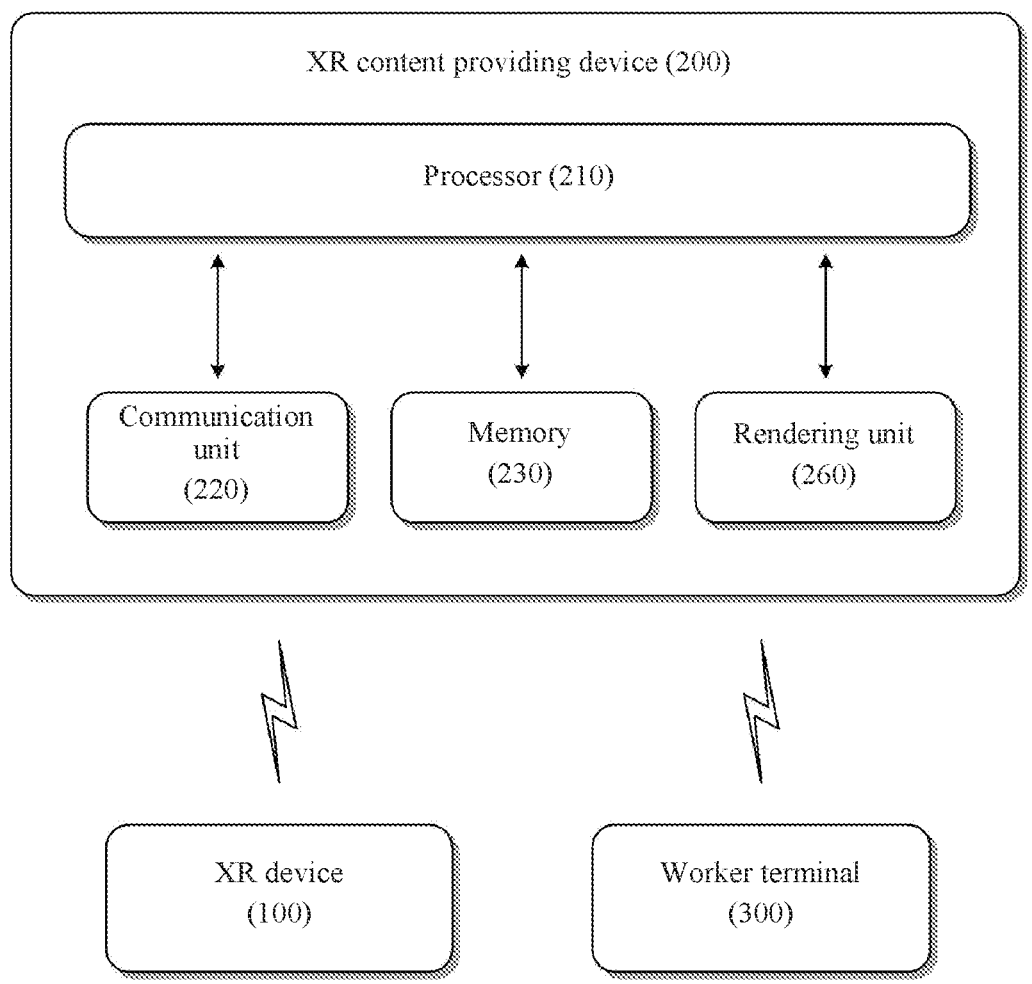
FIG. 12 is a block diagram illustrating XR content providing device, according to an embodiment of the present disclosure.

FIG. 12 is a block diagram of the XR content providing device 200 according to an embodiment of the present disclosure.

Referring to FIG. 12, according to an embodiment of the present disclosure, the XR content providing device 200 includes a processor 210, a communication unit 220, a memory 230, and a rendering unit 260.

Figure 13:
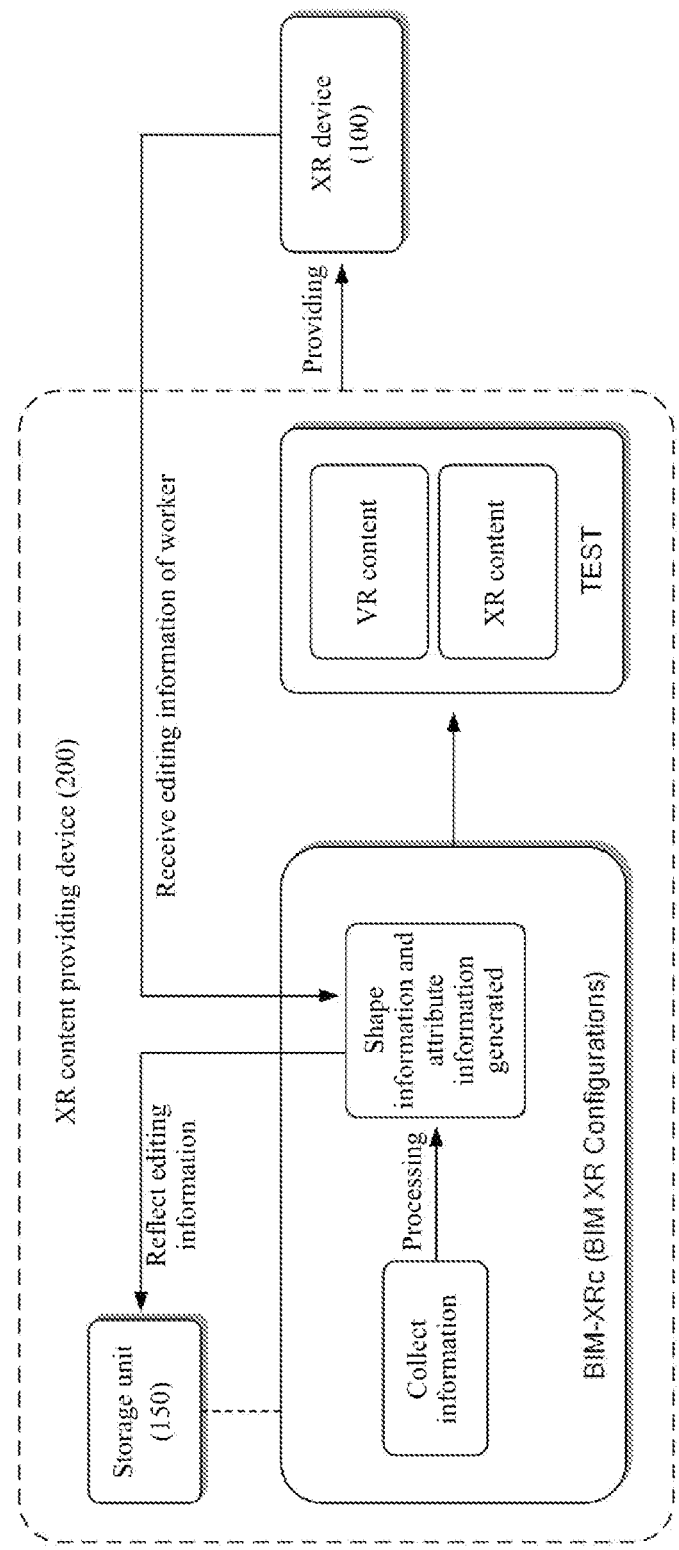
FIG. 13 is a view illustrating an operation of XR content providing device, according to an embodiment of the present disclosure.

FIG. 13 is a view illustrating the operation of the XR content providing device 200 according to an embodiment of the present disclosure.

Since the processor 210, the communication unit 220, and the memory 230 have the basic functions the same as the above-described basic functions, the duplication thereof will be omitted to avoid redundancy. The following description will be made while focusing a method for providing the extend reality content.

The processor 210 controls components in the XR content providing device 200, and provides XR content providing service by executing various commands, and algorithms stored in the memory 230.

According to some embodiments, the processor 210 may provide XR content providing service using an artificial intelligence (AI) model which is trained previously.

In addition, the processor 210 may control the combination of any one or more of the components discussed above to implement, on the device, various embodiments, which are to be described below with reference to accompanying drawings, of the present disclosure.

The communication unit 220 receives BIM design data from worker terminals 300 of a plurality of different workers, and communicates with the XR device 100 of the site worker.

The memory 230 may store shape information and attribute information generated based on the BIM design data received from the worker terminal 300 of the plurality of different workers, and may include a plurality of different storage spaces. According to some embodiments, the memory 230 may further include a cloud storage space.

The memory 230 stores a plurality of templates, which are preset, to generate XR content.

According to an embodiment of the present disclosure, the pre-set templates are pre-made such that the XR content is generated when the processor 210 reflects the shape information and attribute information of the object, and may have basic matters for XR content which are preset.

According to some embodiments, the memory 230 may store the BIM design data received from the worker terminals 300 of the plurality of different workers.

The rendering unit 260 may perform a rendering operation for a 3D image by using the BIM design data, and the shape information and the attribute information of the object.

In addition, when the processor 210 receives an operating signal or editing information for an object, which is contained in the XR content, from the XR device 100, the processor 210 controls the rendering unit 260 to perform the rendering operation for the object in real time depending on the received operation signal or editing information, and provides the rendered image to the XR device 100, such that site workers may feel the same realism as actually manipulating and editing objects.

The processor 210 stores the BIM design data, which are received from the worker terminals 300 of the plurality of different workers, in the memory 230.

The processor 210 generates the shape information and the attribute information for generating at least one piece of XR content, based on the received BIM design data.

The processor 210 generates at least one piece of XR content, based on the shape information and the attribute information generated in S200.

The processor 210 transmits at least one piece of XR content to the XR device 100 and controls the at least one XR content to be displayed on the XR device 100.

When editing information on the XR content is received from the XR device 100, the processor 210 reflects the change corresponding to the editing information in the XR content and provides the changed content to the XR device 100.

The XR content providing device 200 according to an embodiment of the present disclosure may generate the at least one piece of XR content based on the templates which are preset.

In this case, the XR content providing device 200 generates XR content by automatically applying different data to Templates according to the construction process to generate content.

In this time, the data to be applied/input to the templates is information on the construction process, and the shape information and attribute information may correspond to the information on the construction process.

In other words, the processor 210 generates the shape information and attribute information for generating XR content, based on the BIM design data, which refers to generating information to be applied/input to the templates preset, to generate the XR content for the relevant construction process.

Hereinafter, performing the operation of the processor 210 will be described in more detail.

According to an embodiment of the present disclosure, XR content may be applied to any one technology of a virtual reality technology, or augmented reality technology. For example, the XR content may include AR content, VR content, and MR content.

As described above, the communication unit 220 of the XR content providing device 200 may receive design data from worker terminals 300 of various workers, such as Civil, Structure, Architecture, HVAC, UT, EL, IN, FF, and FI.

In addition, the processor 210 may store the design data, which is received from the worker terminal 300 of the worker, in the memory 230.

The BIM design data received from the worker terminal 300 of the worker is BIM design data for the field of the worker in charge among various BIM design data, and is to be transformed to XR content.

According to an embodiment of the present disclosure, the XR content providing device 200 may generate at least one of shape information and attribute information, based on the BIM design data.

More specifically, the memory 230 stores an algorithm for collecting information and an algorithm for transforming information.

The processor 210 may collect BIM design data received from the worker terminals 300 of a plurality of different workers through the algorithm for collecting the information. The processor 210 may transform the collected data to shape information and attribute information for generating the XR content.

Next, the processor 210 may generate at least one object in the XR content based on the shape information and the attribute information.

In other words, according to an embodiment of the present disclosure, the XR content providing device 200 may generate the XR content by generating an object including the shape information and the attribute information necessary for design using design data for the construction site.

According to an embodiment of the present disclosure, the memory 230 may store a Revit program, and the processor 210 may generate Revit object data including shape information and attribute information by collecting and converting BIM design data using the Revit program.

According to an embodiment of the present disclosure, the shape information of the object may include information which may be displayed in a shape through XR content.

The processor 210 may determine a visual attribute or a non-visual attribute by analyzing the BIM design data, determine at least one object to be displayed in the XR content based on the determination result, and generate the shape information and the attribute information for each object.

According to an embodiment, the processor 210 may analyze the data collected on the BIM design data to extract an object included in the design data, and generate the shape information and attribute information for each object, based on the BIM design data related to each object.

For example, the processor 210 may extract objects, such as pipes, fire-fighting facilities, pillars, or communication facilities, which are included in BIM design data, and generate shape information and attribute information of each of the extracted objects.

The processor 210 extracts an object, which is included in the BIM design data, and generates shape information and attribute information of each object through the above process. Accordingly, the processor 210 may generate the XR content using the shape information and the attribute information.

The processor 210 may perform a test on the generated XR content to detect an object or error which is incorrectly generated in the content. In addition, the processor 210 may convert the tested XR content into an available state and provide the XR content, in response to the request of the worker in the site through the XR device 100.

The processor 210 may control the rendering unit 260 to render each selected object in the XR content based on the shape information of each selected object.

The processor 210 may determine whether to display or hide each object, which is contended in the XR content, under the basic viewing condition of the XR device 100.

In this case, the basic viewing condition is a condition in which a function, such as zoom-in, zoom-out, or transmission, is not executed. When the condition for viewing XR content in the XR device 100 is changed, an object to be displayed as XR content may be changed.

According to an embodiment, the processor 210 may hide an object out of range through the Sphere Mask setting, and may provide a cross-sectional view function through the setting of 'section'.

The processor 210 may provide at least one piece of XR content to the XR device 100 connected to the XR content providing device 200.

In more detail, when a request signal for XR content is received from the XR device 100, the processor 210 may transmit and provide at least one piece of XR content corresponding to the request signal to the XR device 100.

In this case, the request signal for XR content may be performed by recognizing a reference mark (e.g., a code), and in detail, may be implemented by recognizing a QR marker.

Accordingly, when a site worker at a specific construction site recognizes the QR Marker at the site while carrying or wearing the XR device 100, XR content is requested, and the XR content providing device 200 transmits XR content, which corresponds to the information about the QR Marker, to the XR device 100.

In this case, when the position information of the QR marker matches the position information of the XR device 100, the processor 210 may transmit the XR content.

Although the QR marker is described as the request signal according to the above-described embodiment, it is not necessarily required to proceed through the method for recognizing the code.

The processor 210 may determine the level of detail (LOD) of each object based on the shape information of each object included in the XR content, and control the rendering unit 260 based on the determined LOD of each object to render each object in at least one piece of XR content.

According to an embodiment, the processor 210 may calculate an importance based on the role of each object in at least one piece of XR content, and calculate the LOD based on the calculated importance.

According to an embodiment, the importance of each object is set for each category, and the processor 210 may determine the role of each object depending on the purpose of the XR content.

The processor 210 may calculate the relative importance and visibility of each object contained in the XR content displayed on the XR device 100, based on the position information of each object included in the at least one piece of XR content, the real-time position of the XR device 100, and shape information and attribute information of each object.

The processor 210 may determine whether to display or hide each object on or from the XR content, based on the calculated relative importance and visibility.

According to an embodiment, the processor 210 may determine whether to display or hide each object on or from XR content based on the importance with at least one object adjacent to each object.

For example, all objects are displayed with respect to XR content in a first Raw state in which any control signal is not input. When a site worker wears the XR device 100, state information of each object is generated based on the information and position of the site worker and the relative relationship between the site worker and each object, and reflected in the XR content such that each object is rendered.

According to an embodiment, the processor 210 may highlight an object, which has specific importance or more, among the objects and display the highlighted object on the XR content.

The processor 210 may reload the position information of the XR device 100 at every preset time to recalculate the relative importance and visibility, and reflect the relative importance and the visibility in the XR content, thereby performing a rendering operation such that the change for each object included in the XR content displayed with respect to the XR device 100 is reflected.

The XR content providing device 200 may highlight or display a specific object having the higher importance in a relevant site through the above configuration, or hide a specific object having the less importance in the site or having a longer distance from a present position of a worker without being displayed, to provide a sense of realism to a site worker carrying and wearing the XR device 100.

According to an embodiment of the present disclosure, the XR content providing device 200 may provide various operating options according to the specifications of the XR device 100.

In more detail, the processor 210 may determine an operating option of the XR device 100 based on the capacity of the XR content to be provided to the XR device 100 and the specifications of the XR device 100.

In this case, the operating option may include a first operating option for providing XR content through a wireless communication manner and a second operating option of a stand-alone manner.

Figure 14:
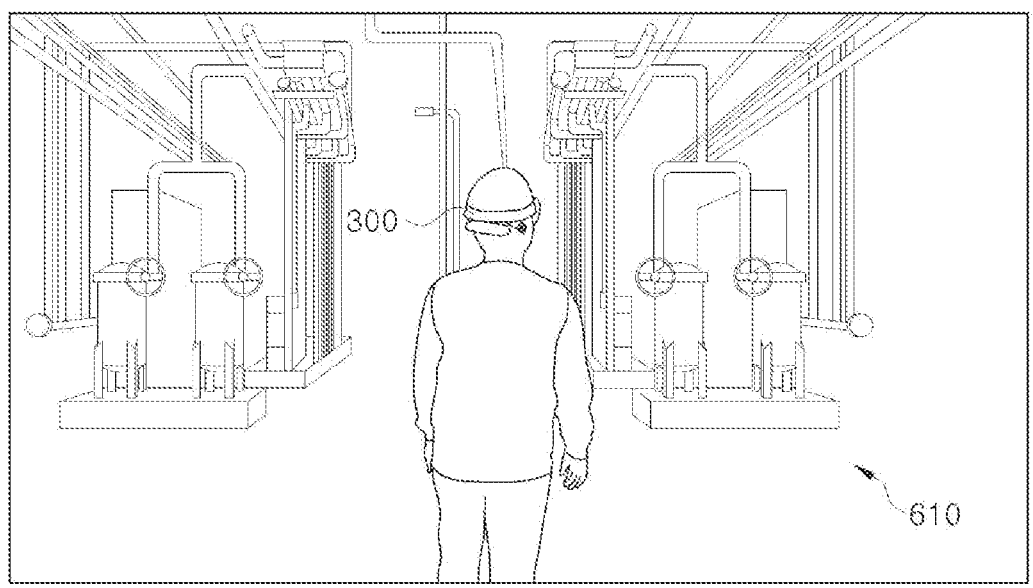
FIG. 14 is a view illustrating that XR content of a site is displayed through an XR device worn by a site worker.

FIG. 14 is a view illustrating that XR content of a site is displayed through the XR device 100 worn by the site worker.

Figure 15:
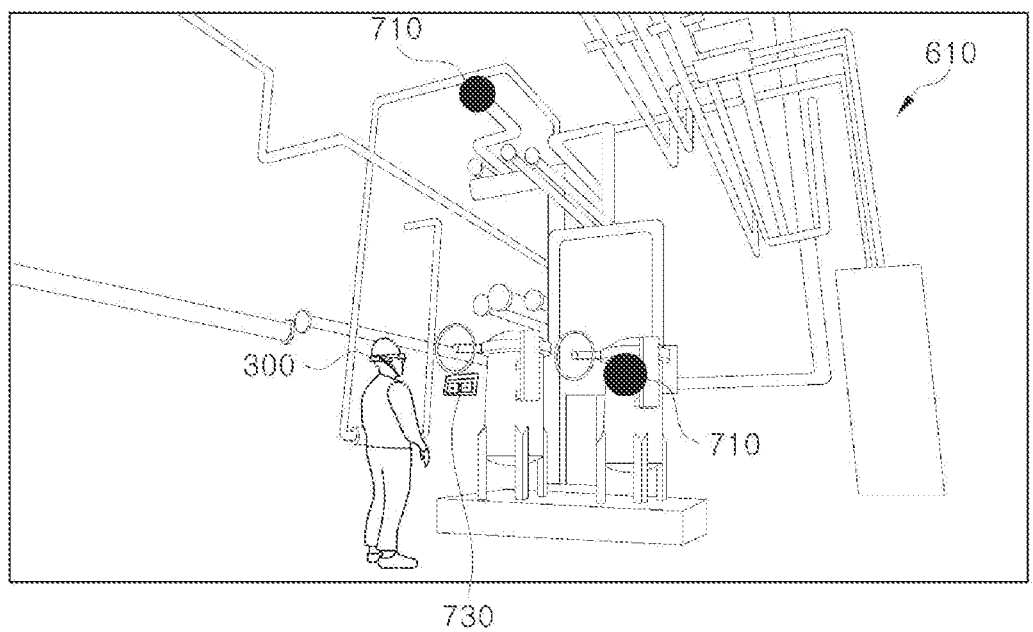
FIGS. 15 to 17 are views illustrating that an object in XR content is edited and reflected and displayed in XR content in response to a signal input to an XR device.
Figure 16:
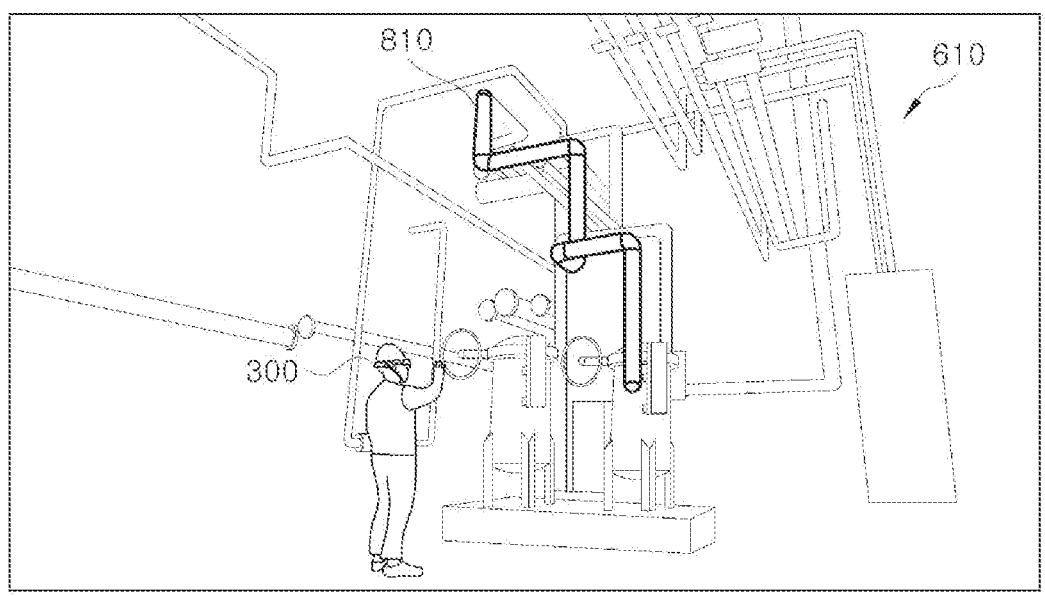
Figure 17:
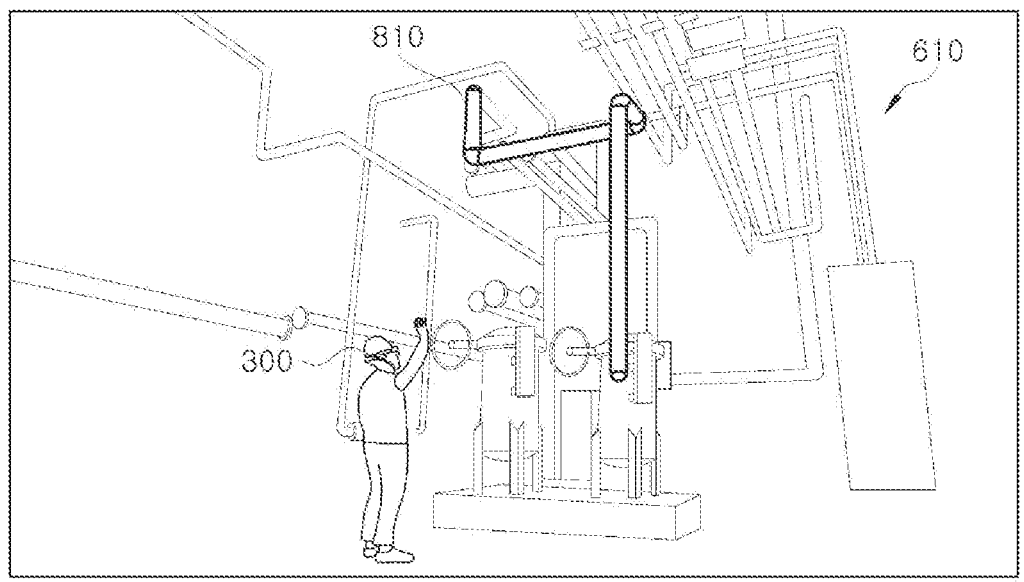

FIGS. 15 to 17 are views illustrating that an object in the XR content is edited and reflected and displayed in the XR content in response to a signal input to the XR device 100.

Figure 18:
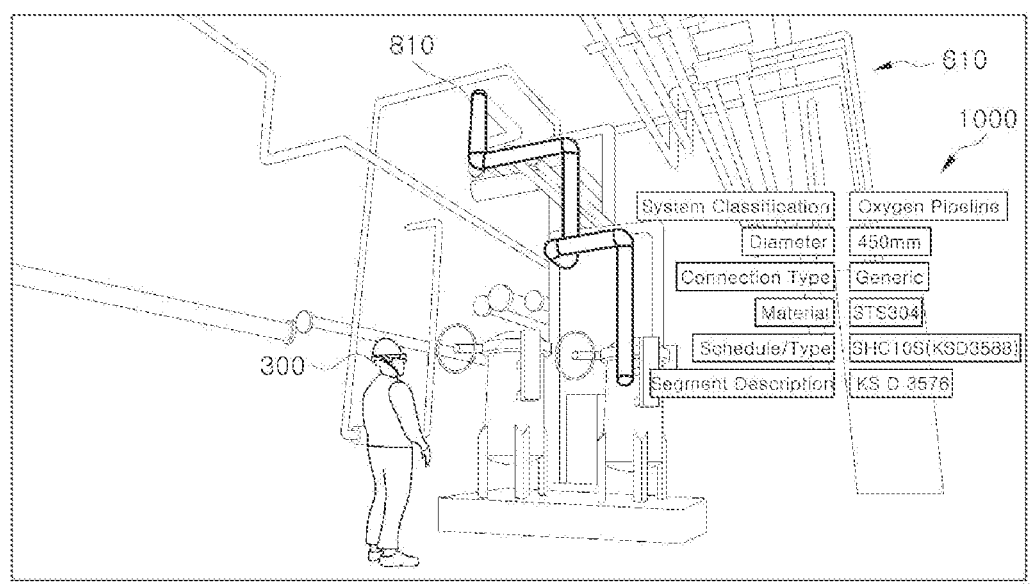
FIG. 18 is a view illustrating that attribute information of an object selected by a site worker is displayed in the XR content.

FIG. 18 is a view illustrating that the attribute information of an object selected by the site worker is displayed in the XR content.

Hereinafter, the site worker editing an object in the XR content through the XR device 100 will be described with reference to FIGS. 14 to 18.

The processor 210 may display XR content including an object around the site worker through the XR device 100 worn by the site worker, thereby providing a sense of realism as if the site worker is actually looking at the site.

According to some embodiments, the XR device 100 may further include an input unit (e.g., a microphone).

In addition, according to an embodiment of the present disclosure, the XR device 100 may be equipped with a transparent display to operate based on augmented reality.

When the gesture of a worker sensed from real-time sensing data sensed through the sensor unit 140 of the XR device 100, the processor 110 may recognize the gesture and generate an input signal based on the recognized gesture.

FIG. 14 illustrates that XR content 610 including an object existing in the site is displayed on a display of the XR device 100 worn by the site worker.

When a worker inputs a selection signal using a gesture for a specific object contained in the XR content, the processor 210 may perform a rendering operation for indicating that an object 710 is selected by highlighting the object 710 as illustrated in FIG. 15 and provide the XR content.

Referring to FIG. 15, two objects in the XR content are selected according to the control of the XR device 100 of the user, and a widget UI 730 is displayed in front of the user.

When a UI call signal is received from the XR device 100, the processor 210 may provide a UI to the display of the XR device 100 by performing a rendering operation the UI called to the XR content.

According to an embodiment, the processor 210 may select a UI to be rendered and provided based on at least one object selected by the user.

According to an embodiment, the processor 210 may compare a plurality of objects selected by the user with each other in terms of shape information and attribute information, and select a UI to be provided by rendering, based on the comparison result.

According to an embodiment, the processor 210 may select a specific object in the XR content, edit the selected specific object, delete the selected specific object, or generate a specific object in response to a signal input to and received from the XR device 100.

FIGS. 16 and 17 illustrate that the user edits an object 810 (a pipeline) for two objects 710, which are selected as illustrated in FIG. 15, through the XR device 100.

Referring to FIG. 18, when a signal for selecting a specific object in the XR content is input and received from the XR device 100, and a signal for searching for attribute information on the selected specific object is received, the processor 210 may render attribute information 1000 of the relevant object with respect to XR content, in response to the signal for searching for the attribute information.

When searching for an object is requested based on the specific attribute information by the XR device 100, the processor 210 may select or display an object having the relevant attribute information in the XR content through a filtering function. The processor 210 provides a function of simultaneously editing a plurality of objects by providing multiple editing functions for a plurality of objects searched and selected as described above.

The processor 210 provides a function of editing attribute information (e.g., material, etc.) on the plurality of objects searched and selected by providing the multiple editing functions for the plurality of objects searched and selected as described above.

When the displaying or the hiding of the plurality of objects selected through object searching is selected, the processor 210 may render the XR content based on the selection.

When at least one object is selected from the XR device 100 and editing information (addition, deletion, or correction) on the attribute information of the selected object is received, the processor 210 may edit the attribute information of the corresponding object based on the received editing information.

As described above, the processor 210 generates at least one piece of XR content by inputting/applying the shape information and the attribute information based on preset templates. When editing information is received from the XR device 100, the input/applied information is automatically edited, such that the editing history of the site worker may be reflected.

In addition, when the editing information is related to a specific object, the processor 210 may edit at least one of the shape information and attribute information of the corresponding object.

In addition, when an input for a note, or voice for an object which is selected is received from the XR device 100, the processor 210 may store the input in the memory 230.

The processor 210 edits information on an object in the XR content based on the editing information received from the XR device 100, and renders the image to be reflected in an object displayed with respect to the XR content based on the edited details.

In addition, the processor 210 stores the editing information in the memory 230 such that the editing information is reflected even in the BIM design data.

As described above, the method according to an embodiment of the present disclosure may be implemented in the form of a program (or application) to be stored in a medium, so as to be executed in combination with a computer which is hardware.

The above-described program may include codes made in a computer language, such as "C", "C++", "JAVA", or machine language, which is readable through a device interface of the computer by a central processing unit (CPU), to execute, by the computer, the method implemented in program, by reading out the program. The code may include a functional code related to a function for determining functions necessary for executing the methods, and may include a control code related to execution procedures necessary for execute the functions in specific sequence through the processor of the computer. In addition, such a code may include additional information necessary to execute the functions through the processor of the computer, or a code related to memory reference regarding a position (an address) of an internal memory or an external memory of the computer, to which media are referred. In addition, the code may further include a code related to a computer or a server for communication with the processor of the computer, which is positioned at a remote place and related to a communication manner with the computer or the server, when the processor of the computer requires the communication with the computer or the server at the remote plate to execute the functions. In addition, the code may further include a communication code indicating information for communication and media to be transmitted or received.

The stored medium refers to a medium for permanently storing data and readable by machine, as well as a medium, such as a register, a cache, or a memory, within a short period time. In detail, although the stored medium includes a read-only medium (ROM), a random access memory (RAM), a CD-ROM, a magnetic tape, a floppy-disc, or an optical data storage device, the present disclosure is not limited thereto. In other words, the program may be stored in various recording media on various servers to be accessed by the computer, or various recording media on the computer of the user. In addition, the medium may store codes distributed into computer systems connected over a network and readable by a computer through a distribution manner.

The method or the algorithm steps described regarding the embodiment of the present disclosure may be implemented in hardware, and implemented with a software module executed by the hardware, or the combination of the software and the hardware. A soft module may reside in a random access memory (RAM), a read only memory (ROM), an erasable programmable ROM (EPROM), an electrically erasable programmable ROM (EEPROM), a flash memory, a hard disk, a removable disk, a CD-ROM, or a computer readable recording medium well known in the art to which the present disclosure pertains.

As described above, according to an embodiment, the apparatus for providing construction precision based on XR may be provided.

According to an embodiment of the present disclosure, the at least one piece of XR content related to the construction target may be displayed on the display unit.

According to an embodiment of the present disclosure, the XR content including design information of the construction object at the construction position of the construction object, which is included in a construction target, may be displayed on the display unit, when the construction position is determined.

The effects of the present disclosure are not limited to the above-described effects, and other effects are able to be apparently understood by those skilled in the art through the detailed description of the present disclosure.

Although the embodiment of the present disclosure have been described with reference to accompanying drawings, those skilled in the art should understand that various modifications are possible without departing from the technical scope of the present disclosure or without changing the technical sprite or the subject matter of the present disclosure. Therefore, those skilled in the art should understand that the technical embodiments are provided for the illustrative purpose in all aspects and the present disclosure is not limited thereto.

While the present disclosure has been described with reference to embodiments, it will be apparent to those skilled in the art that various changes and modifications may be made without departing from the spirit and scope of the present disclosure. Therefore, it should be understood that the above embodiments are not limiting, but illustrative.

What is claimed is:

1. An apparatus for improving construction precision based on extended reality (XR), the apparatus comprising:
   a display unit configured to display at least one piece of XR content related to a construction target positioned in front inside a construction site;
   a sensor unit configured to recognize an identification (ID) code for information related to the construction target in the construction site; and
   a processor configured to acquire the related information through the ID code recognized through the sensor unit;
   detect a construction position of the construction target, based on the acquired related information; and
   control to display the XR content on the display unit, based on the detected construction position.

2. The apparatus of claim 1, wherein the processor is configured to:
   control to display XR content, which includes design information of a specific construction object, which included in the construction target, at a construction position of the specific construction object, on the display unit, when the construction position of the specific construction object included in the construction target is determined, based on a sensing result obtained through the sensor unit.

3. The apparatus of claim 2, wherein the processor is configured to:
   recognize construction instruction information marked in the construction site, based on the sensing result obtained through the sensor unit; and
   compare the construction instruction information recognized with design information of a design object to calculate an error rate.

4. The apparatus of claim 3, wherein the processor is configured to:
   display, on the display unit, at least one piece of XR content including correction information for correct an error of the recognized construction instruction information, based on the construction instruction information and the design information of the construction object, when the calculated error rate is out of a preset error range.

5. The apparatus of claim 2, wherein the processor is configured to:
   determine a construction stage of the construction target by identifying at least one of a construction object constructed in a construction site or construction instruction information marked in the construction site, based on the sensing result obtained through the sensor unit, and
   control to display at least one piece of XR content for next construction of the construction target on the display unit, depending on the determined construction stage.

6. The apparatus of claim 1, wherein the processor is configured to:
   control to display XR content, which is to instruct a construction object included in the construction target to be marked at a position to be constructed, on the display unit, based on a sensing result obtained through the sensor unit.

7. The apparatus of claim 1, wherein the apparatus senses the construction site without movement, to a time point at which construction of the construction target is finished, from a time point at which the construction of the construction target is started.

8. The apparatus of claim 1, wherein the processor is configured to:
   determine the construction position of the construction target in a relational enhancement manner, based on position relationship between a plurality of identification codes sensed through the sensor unit, when the plurality of identification codes are sensed through the sensor unit.

9. A method executed by an apparatus for improving construction precision based on XR, the method comprising:
   recognizing an ID code for information related to a construction target in a construction site, based on a sensing result obtained through a sensor unit;
   acquiring the related information, based on the recognized ID code;
   detecting a construction position of the construction target, based on the acquired related information; and
   displaying at least one piece of XR content related to the construction target positioned in front, in the construction site on a display unit, based on the detected construction position.

10. A non-transitory computer-readable medium having program to execute the method of claim 9 through combination of a computer which is hardware.

* * * * *